United States Patent
Zhang et al.

(10) Patent No.: US 11,247,199 B2
(45) Date of Patent: Feb. 15, 2022

(54) LEWIS ACID-BASE PAIR CATALYTIC INITIATOR AND APPLICATION THEREOF

(71) Applicant: ZHEJIANG UNIVERSITY, Hangzhou (CN)

(72) Inventors: Xinghong Zhang, Hangzhou (CN); Jialiang Yang, Hangzhou (CN); Lanfang Hu, Hangzhou (CN)

(*) Notice: Subject to any disclaimer, the term of this patent is extended or adjusted under 35 U.S.C. 154(b) by 0 days.

(21) Appl. No.: 17/356,509

(22) Filed: Jun. 24, 2021

(65) Prior Publication Data

US 2021/0316287 A1    Oct. 14, 2021

Related U.S. Application Data

(63) Continuation of application No. PCT/CN2019/124424, filed on Dec. 11, 2019.

(30) Foreign Application Priority Data

Dec. 25, 2018 (CN) .......................... 201811594131.1

(51) Int. Cl.
*B01J 31/02* (2006.01)
*B01J 31/14* (2006.01)
(Continued)

(52) U.S. Cl.
CPC ......... *B01J 31/0238* (2013.01); *B01J 31/143* (2013.01); *B01J 31/146* (2013.01);
(Continued)

(58) Field of Classification Search
USPC ....................................................... 502/167
See application file for complete search history.

(56) References Cited

U.S. PATENT DOCUMENTS 10,522,834 B2   12/2019   Yue et al.
2014/0302396 A1   10/2014   Lu et al.
2018/0086858 A1*   3/2018   Knaus ................. C08F 120/06

FOREIGN PATENT DOCUMENTS

CN   103189413 A       7/2013
CN   106188507 A      12/2016
CN   111320717 A  *   6/2020

OTHER PUBLICATIONS

CN-111320717-A Machine Translation; Xian Mo et al. Method for catalyzing Vinyl monomer polymerization by using hindered Lewis acid-base Pair based on binuclear Aluminum Lewis Acid. (Year: 2020).*

(Continued)

*Primary Examiner* — Terressa Boykin (57) ABSTRACT

The present disclosure provides a Lewis acid-base pair catalytic initiator and an application thereof. The Lewis acid-base pair catalytic initiator includes a Lewis acid and a Lewis base, the Lewis acid having a structural general formula as shown in formula (I) and the Lewis base having a structural general formula as shown in formula (II); wherein: the A is selected from element Baron or element Aluminum; the $R_1$, $R_2$, $R_3$, $R_4$ are independently selected from alkyl, alkoxy, aryl or halogen groups; the alkyl or alkoxy have a carbon number being equal to or greater than 1 to equal to or less than 16; the aryl contains substituents with the number being equal to or less than 5, the substituents being selected from methyl, methoxy or halogen; n is selected from an integer from 1 to 16.

10 Claims, 6 Drawing Sheets

(51) Int. Cl.
*C08G 59/68* (2006.01)
*C08G 63/52* (2006.01)
*C08G 63/87* (2006.01)
*C08G 64/02* (2006.01)
*C08G 64/34* (2006.01)
*C08G 65/26* (2006.01)

(52) U.S. Cl.
CPC ........... *C08G 59/686* (2013.01); *C08G 63/52* (2013.01); *C08G 63/87* (2013.01); *C08G 64/025* (2013.01); *C08G 64/34* (2013.01); *C08G 65/269* (2013.01); *C08G 2650/22* (2013.01)

(56) References Cited

OTHER PUBLICATIONS

Internation Search Report of PCT/CN2019/124424, dated Mar. 12, 2020.
Kummari. Anjaneyulu et al. "Fully alternating and regioselective ring-opening copolymerization of phthalic anhydride with epoxides using highly active metal-free lewis pairs as a Catalyst" Polym. Chem., vol. 9, Jul. 4, 2018 (Jul. 4, 2018). pp. 4052-4062.

* cited by examiner

LEWIS ACID-BASE PAIR CATALYTIC INITIATOR AND APPLICATION THEREOF

CROSS-REFERENCE TO RELATED APPLICATIONS

This application is a continuation of International Patent Application No. PCT/CN2019/124424 with a filing date of Dec. 11, 2019, designating the United States, now pending, and further claims priority to Chinese Patent Application No. 201811594131.1 with a filing date of Dec. 25, 2018. The content of the aforementioned applications, including any intervening amendments thereto, are incorporated herein by reference.

TECHNICAL FIELD

The present disclosure relates to the field of catalysts, and in particular to a Lewis acid-base pair catalytic initiator and an application thereof in the preparation of epoxide homopolymers and epoxide copolymers.

BACKGROUND

The application of Lewis acid-base pairs (LPs) to catalytic polymerization was first reported by Colorado State University in 2010 and was initially oriented toward the preparation of polyolefin materials from polar vinyl monomers. The LPs have been widely studied in China and abroad due to their high activity, high controllability, and easy modulation of polymerization effects. Recent research results show that the LPs can catalyze epoxide/cyclic anhydride copolymerization, epoxide/carbon dioxide($CO_2$)(carbonyl sulfide, COS) copolymerization, and epoxide/cyclic anhydride/$CO_2$ copolymerization reactions to synthesize polyesters, poly(carbonate)s, poly(carbonate-ether)s, poly(thiocarbonate)s, and poly(carbonate-ester)s. However, the low initiation efficiency and the "slow initiation, fast growth" polymerization mode have led to a low activity and poor control of the existing catalytic system.

Turnover frequency (TOF), i.e., the number of monomers converted at a single active site per unit time, measures the rate of catalytic reaction of a catalyst and represents the intrinsic activity of the catalyst.

In 2016, Xiaoshuang FENG et al. (Zhang, D.; Boopathi, S. K.; Hadjichristidis, N.; Gnanou, Y.; Feng, X. *Journal of the American Chemical Society*, 2016, 138, 11117.) reported that an acid-base pair consisting of quaternary ammonium salts and triethylborane successfully catalyzed the copolymerization of carbon dioxide with epoxide, but the copolymerization of carbon dioxide with propylene oxide was not achieve 100% alternating degree of polycarbonate due to low catalytic activity, and TOF was only 49 $h^{-1}$.

In 2017, Xinghong ZHANG et al. (Yang, J. L.; Wu, H. L.; Li, Y.; Zhang, X. H.; Darensbourg, D. J. *AngewandteChemie* 2017, 56, 5774.) reported the use of guanidinium amines, amidine, quaternary ammonium salts or quaternary phosphonium salts as Lewis base catalytic systems that can catalyze the alternating copolymerization of carbon oxysulfide with multiple epoxides to produce structurally well-defined poly(monothiocarbonate). However, again limited by the activity of the catalytic system, TOF of this system can only reach 113 $h^{-1}$.

Therefore, the development of a Lewis acid-base pair with high catalytic activity remains the focus of current research and development.

SUMMARY OF THE DISCLOSURE

The present disclosure provides a Lewis acid-base pair consisting of or including a special kind of Lewis acid and a Lewis base with both catalytic and initiating functions, which can be used to catalyze epoxide homopolymerization reactions as well as epoxide copolymerization reactions with remarkably high catalytic activity and conversion frequencies of up to 22,500 $h^{-1}$.

Specifically, the technical solutions may be as followed.

The present disclosure provides a Lewis acid-base pair catalytic initiator, including a Lewis acid and a Lewis base, the Lewis acid having a structural general formula as shown in formula (I) and the Lewis base having a structural general formula as shown in formula (II);

wherein:

the A is selected from element Baron or element Aluminum;

the $R_1$, $R_2$, $R_3$, $R_4$ are independently selected from alkyl, alkoxy, aryl or halogen groups;

the alkyl or alkoxy have a carbon number being equal to or greater than 1 to equal to or less than 16;

the aryl contains substituents with the number being equal to or less than 5, the substituents being selected from methyl, methoxy or halogen;

n is selected from an integer from 1 to 16.

It has been found that the ligand bond structure in the Lewis acid base pair is an active center of the catalytic polymerization reaction, and that after the structure acts on the epoxide to open its ring and insert a molecule of comonomer, the chain initiation phase of the polymerization reaction can be considered complete, and a chain growth center is formed. The Lewis bases of guanidinium amine or quaternary ammonium salts, disclosed in the BACKGROUND, can also be combined with Lewis acids such as triethylborane to form active Lewis acid base pairs. However, under the combined effect of site blocking and electronic effects, the formation of active centers is slow, which is typical of the "slow initiation, fast growth" polymerization mode, resulting in the problem of unpredictable molecular weight size of the polymer and wide molecular weight distribution. Moreover, the Lewis acid-base pairs have a low probability of collision of activated carbon dioxide molecules with the active center in polymerization reactions involving carbon dioxide, resulting in a slow insertion rate that is not conducive to the formation of fully alternating polymers. These problems greatly limit the application of Lewis acid base pair in the synthesis of polymeric materials.

The Lewis acid-base pair disclosed in the present disclosure takes a boron- or aluminum-containing compound as the Lewis acid, and takes a tertiary amine compound with a moderate alkalinity and a certain amount of site resistance as the Lewis base. The ligand bond structure composed of this

Lewis acid-base pair can greatly enhance the speed of forming the polymerization active center and change the polymerization mode to "fast initiation, fast growth ($R_i>>R_p$)". The Lewis acid-base pair can be used to catalyze epoxide homopolymerization reactions as well as epoxide copolymerization reactions to achieve precise control of the polymerization process and synthesize a variety of polyethers, polyesters, polycarbonates, polythiocarbonates and their block copolymers with well-defined structures and rich properties. Further, based on kinetic studies as well as nuclear magnetic (NMR) and matrix-assisted laser desorption-time of flight mass spectrometry (MALDI-TOF-MS) analysis of the polymer, it can be determined that the polymer prepared by this Lewis acid-base pair-catalyzed initiation system has a hydroxyl group at one end and a chlorine group at the other end. The hydroxyl group at the end of the chain indicates that the polymerization reaction ends with the ring opening of attacking epoxide, and the chlorine end group is formed by the action of the quaternary ammonium salt at the beginning of the chain with hydrochloric acid during a post-treatment process, which is consistent with the proposed mechanism of Lewis base as initiator.

In some embodiments, the Lewis acid is selected from at least one of triethylborane (a), tripropylborane(b), tributylborane(c), tri-see-butylborane (d), triphenylborane(e), tris(pentafluorophenyl)borane(f), diethylmethoxyborane (g), di(trimethylphenyl)boranefluoride (h), trimethylaluminum (i), triethylaluminum (j), triisobutylaluminum (k), triphenylaluminum (l), and tris(pentafluorophenyl)aluminum (m).

(e)

(f)

(g)

(h)

(i)

(j)

(k)

(l)

(m)

In some embodiments, the Lewis base is selected from at least one of N,N,N',N-tetramethylmethanediamine (A), N,N,N',N'-tetramethylethylenediamine (B), N,N,N',N-tetraethylmethanediamine (C), N,N,N',N'-tetraethylethylenediamine (D), and N,N,N',N-tetraethyl-1,3-propanediamine (E), (A)

(B)

(C)

(D)

(E)

It is found that the Lewis base pair obtained by using the bicentered tertiary amine as the Lewis base has higher catalytic activity when compounded with boron- or aluminum-containing Lewis acids. The analysis of the reason may be because the double-centered tertiary amine can increase the action of catalytic initiator and monomer, and thus can be explained from the point of view of increasing the pre-exponential factor of Arrhenius formula to achieve an increase in polymerization rate.

The present disclosure further provides an application of the Lewis acid-base pair catalytic initiator according to claim 1 or 2 in a preparation of an epoxide homopolymer and an epoxide copolymer, such that the Lewis acid-base pair catalytic initiator is proved to have excellent catalytic activity.

Specifically, when applied to the preparation of epoxide homopolymers, the homopolymerization reaction is carried out under native or solution conditions using an epoxide as a monomer and the Lewis acid base pair as both catalyst and initiator, with a molar ratio of 0.125:1 to 8:1 of the Lewis acid to the Lewis base.

The epoxide is selected but not limited from at least one of ethylene oxide, propylene oxide, epichlorohydrin, allyl glycidyl ether, 1,2-butylene oxide, isobutylene oxide, cyclohexene oxide, 4-vinyl cyclohexene oxide, styrene oxide, limonene oxide, cyclopentene oxide and alpha-alkene oxide from C5 to C20. In some embodiments, the epoxide is selected from propylene oxide (PO).

The molar ratio of the Lewis acid to the Lewis base is from 0.5:1 to 4:1.

A molar ratio of the Lewis base to the epoxide is from 1:50 to 1:4000.

The solution is selected from all conventional solvent types suitable for the present polymerization reaction, including at least one of tetrahydrofuran, toluene, trichlorobenzene, o-dichlorobenzene, n-dichlorobenzene, p-dichlorobenzene, dimethylformamide, etc.

Preferably:

The molar ratio of the Lewis acid to the Lewis base is from 2:1 to 4:1.

The molar ratio of the Lewis base to the epoxide is from 1:1000 to 1:2000.

The epoxide homopolymer may be prepared with an addition of a chain transfer agent, on one hand to play a role in regulating the molecular weight of the polymerization product, on the other hand to act as a polymer chain initiator. In this way, in the role of less initiator, polymer chains may be obtained, significantly reducing the production cost of the polymerization reaction.

Specifically, the chain transfer agent is selected from at least one of alcoholic small molecules, a terminal hydroxyl group polymer, a carboxylic acid small molecule, and a terminal carboxyl group polymer. This includes water, methanol, ethanol, benzyl alcohol, phenethyl alcohol, polyethylene glycol, polypropylene glycol, polyethylene glycol methyl ether, acetic acid, benzoic acid, etc.

Preferably, the chain transfer agent is selected from a telechelic polymer with a hydroxyl or carboxyl end group and a molecular weight of 200 to 5000 g/mol, such as polyethylene glycol methyl ether 2000 or polyethylene glycol 4000.

Preferably, the molar ratio of the chain transfer agent to the Lewis base is 5:1 to 100:1; further preferably 5:1 to 20:1.

The temperature of the homopolymerization reaction is from 0 to 100° C., further preferably from 40 to 60° C.

In some embodiments:

The Lewis acid is selected from at least one of triethylborane, tributylborane, di(trimethylphenyl)borane fluoride, and triethylaluminum.

The Lewis base is selected from at least one of N,N,N',N'-tetraethyl ethylenediamine, N,N,N',N'-tetraethyl propanediamine, N,N,N',N'-tetraethyl methylenediamine, N,N,N',N'-tetramethylethylenediamine, and N,N,N',N'-tetramethylethylenediamine.

When applied to the preparation of epoxide copolymers, a copolymerization monomer is added in addition to the epoxide as monomer. The copolymerization reaction is carried out under a native or solution condition using the Lewis acid base pair as both catalyst and initiator, with a molar ratio of 0.125:1 to 8:1 of the Lewis acid to the Lewis base.

The epoxide is selected but not limited from at least one of ethylene oxide, propylene oxide, epichlorohydrin, allyl glycidyl ether, 1,2-butylene oxide, isobutylene oxide, cyclohexene oxide, 4-vinyl cyclohexene oxide, styrene oxide, limonene oxide, cyclopentene oxide and alpha-alkene oxide from C5 to C20. In some embodiments, the epoxide is selected from propylene oxide (PO).

The comonomer is selected but not limited from at least one of C1 monomer, cyclic anhydride, and cyclic lactone.

The C1 monomer is selected but not limited from at least one of carbon dioxide, carbon oxysulfide, and carbon disulfide.

The cyclic anhydride is selected but not limited from at least one of maleic anhydride, glutaric anhydride, succinic anhydride, diglycolic anhydride, and phthalic anhydride.

The cyclic lactone is selected but not limited from at least one of propiolactone, butyrolactone, valerolactone, caprolactone, enantolactone, glycolide, lactide, dimethyl trimethylene ester.

In some embodiments:

The molar ratio of the Lewis acid to the Lewis base is from 0.2:1 to 8:1.

A molar ratio of the Lewis base to the epoxide is from 1:50 to 1:4000.

A molar ratio of the epoxide to a comonomer is from 1:1 to 1:10.

The solution is selected from all conventional solvent types suitable for the present polymerization reaction, including at least one of tetrahydrofuran, toluene, trichlorobenzene, o-dichlorobenzene, m-dichlorobenzene, p-dichlorobenzene, dimethylformamide, etc.

The copolymerization reaction may be added with chain transfer agents, which on one hand serve to regulate the molecular mass of the polymerization product, and on the other hand to replace part of the catalyst used, thus significantly reducing the production cost of this polymerization reaction.

Specifically, the chain transfer agent is selected from at least one of alcoholic small molecules, a terminal hydroxyl group polymer, a carboxylic acid small molecule, and a terminal carboxyl group polymer. This includes water, methanol, ethanol, benzyl alcohol, phenethyl alcohol, polyethylene glycol, polypropylene glycol, polyethylene glycol methyl ether, acetic acid, benzoic acid, etc.

Preferably, the chain transfer agent is selected from a telechelic polymer with a hydroxyl or carboxyl end group and a molecular weight of 200 to 5000 g/mol, such as polyethylene glycol methyl ether 2000 or polyethylene glycol 4000.

Preferably, the molar ratio of the chain transfer agent to the Lewis base is 10:1 to 50:1; further preferably 10:1 to 20:1.

The temperature of the copolymerization reaction is from 0 to 100° C. and the reaction is performed for 0.01 to 150 h under autogenous pressure.

In some embodiments, the comonomer is selected from C1 monomer, specifically from carbon dioxide or carbon oxysulfide. Further preferably, the comonomer is selected from carbon oxysulfide. The Lewis acid base pair disclosed in the present invention is found to have higher catalytic activity for the copolymerization reaction of epoxide with carbon oxysulfide.

When the comonomer is selected from carbon dioxide, preferably:

The Lewis acid is selected from at least one of triethylborane, tributylborane, di(trimethylphenyl)borane fluoride, and triethylaluminum.

The Lewis base is selected from N,N,N',N'-tetraethyl ethylenediamine, N,N,N',N'-tetraethyl propylenediamine or N,N,N',N'-tetraethyl methylenediamine.

The molar ratio of the Lewis acid to the Lewis base is from 2:1 to 8:1. The molar ratio of the Lewis base to the epoxide is from 1:50 to 1:500. The molar ratio of the epoxide to the comonomer is from 1:1 to 1:3. The temperature of copolymerization reaction is from 40 to 80° C.

Further preferably:

The Lewis base is selected from N,N,N',N'-tetraethyl ethylenediamine, the molar ratio of the Lewis acid to the Lewis base is 2:1, the molar ratio of the Lewis base to the epoxide is 1:50 to 1:500, and the molar ratio of the epoxide to the comonomer is 1:1.

When the comonomer is selected from carbonyl sulfide (COS), preferably:

The Lewis acid is selected from at least one of triethylborane, tributylborane, di(trimethylphenyl)borane fluoride, and triethylaluminum.

The Lewis base is selected from N,N,N',N'-tetraethyl ethylenediamine, N,N,N',N'-tetraethyl methylenediamine, N,N,N',N'-tetramethylethylenediamine or N,N,N',N'-tetramethylethylenediamine.

The molar ratio of the Lewis acid to the Lewis base is from 0.8:1 to 5:1. The molar ratio of the Lewis base to the epoxide is from 1:500 to 1:2000. The molar ratio of the epoxide to the comonomer is from 1:1 to 1:10. The temperature of copolymerization reaction is from 40 to 80° C.

Further preferably:

The Lewis base is selected from N,N,N',N'-tetraethyl ethylenediamine or N,N,N',N'-tetramethyl methylenediamine.

The molar ratio of Lewis acid to the Lewis base is from 0.8:1 to 2:1. The molar ratio of the Lewis base to the epoxide is from 1:500 to 1:1500. The molar ratio of the epoxide to the comonomer is from 1:1 to 1:5. The temperature of copolymerization reaction is from 40 to 80° C.

Further preferably:

The Lewis base is selected from N,N,N',N'-tetraethyl ethylenediamine; the molar ratio of the Lewis acid to the Lewis base is from 1:1 to 2:1; the molar ratio of the Lewis base to the epoxide is from 1:500 to 1:1000; the molar ratio of the epoxide to the comonomer is from 1:1 to 1:2.

It is found that the Lewis acid base pair is particularly suitable for catalytic initiation of the epoxide/$CO_2$ copolymerization reaction. By observing the $^1H$ NMR spectrum of the product, it is found that the polymerization product prepared by catalytic initiation with this Lewis acid base pair system has a completely alternating structure, and no peaks corresponding to the polyether units are seen.

The Lewis acid-base pair described is also particularly suitable for catalytic initiation of the epoxide/COS copolymerization reaction, which can significantly increase the catalytic activity of the reaction. The most preferred catalytic initiation system is N,N,N',N'-tetraethyl ethylenediamine/triethylborane, which has been tested at conversion frequencies of up to 22,500 $h^{-1}$.

The present disclosure provides a Lewis acid-base pair catalytic system based on a bicentered tertiary amine as Lewis base, which achieves extremely high reactivity for ring-opening polymerization and copolymerization of epoxide monomers. Relative to the prior art, the catalytic system has remarkable structural features and catalytic effects as follows.

1) The conversion frequency of the catalyst is up to 22,500 h$^{-1}$, which is more than two orders of magnitude higher than the activity of known quaternary ammonium salt/Lewis acid or guanidine amine/Lewis acid catalytic systems.

2) The catalytic system catalyzes the copolymerization reaction of epoxides with C1 monomers, which can yield products with fully alternating structures under the conditions of polymerization of equal equivalents of raw materials, maximizing the atomic economy.

DETAILED DESCRIPTION

To describe the present disclosure more specifically, the technical solutions of the present disclosure are described in detail below in conjunction with the accompanying drawings and specific embodiments.

Embodiment 1: PO One-Pot Ring-Opening Polymerization for Synthesizing Polyether

Before the polymerization reaction, a 10 mL autoclave is placed at 110° C. for about 2 h to remove water and cooled to room temperature in a desiccator; several masses of Lewis base 3 N,N,N',N-tetraethyl ethylenediamine (E-E) and Lewis acid triethylborane(TEB) are added to the reactor in a molar ratio of 1:2; propylene oxide (PO) are added, the molar ratio of Lewis base3 to propylene oxide (PO) is 1:1000. The autoclave is then closed and placed in an oil bath at 60° C. under autogenous pressure for 3 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 2: PO One-Pot Ring-Opening Polymerization for Synthesizing Polyether

Before the polymerization reaction, a 10 mL autoclave is placed at 110° C. for about 2 h to remove water and cooled to room temperature in a desiccator; several masses of Lewis base 4 N,N,N',N'-tetraethylmalondiamine (E-P) and Lewis acid triethylaluminum (TEAl) are added to the reactor in a molar ratio of 1:4; propylene oxide (PO) are added, the molar ratio of Lewis base 4 to propylene oxide (PO) is 1:2000. The autoclave is then closed and placed in an oil bath at 40° C. under autogenous pressure for 2.5 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 3: CO$_2$/PO One-Pot Copolymerization for Synthesizing Polycarbonate

Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid tributylborane (TBB) are added to the reactor in a molar ratio of 0.5:1; CO$_2$, propylene oxide (PO) (herein the molar ratio of CO$_2$ to PO is 1:1) and 3 mL of tetrahydrofuran (THF) are added; the molar ratio of Lewis base 3 to PO is 1:500. The autoclave is then closed and placed in an oil bath at 40° C. under autogenous pressure for 8 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Figure 1:
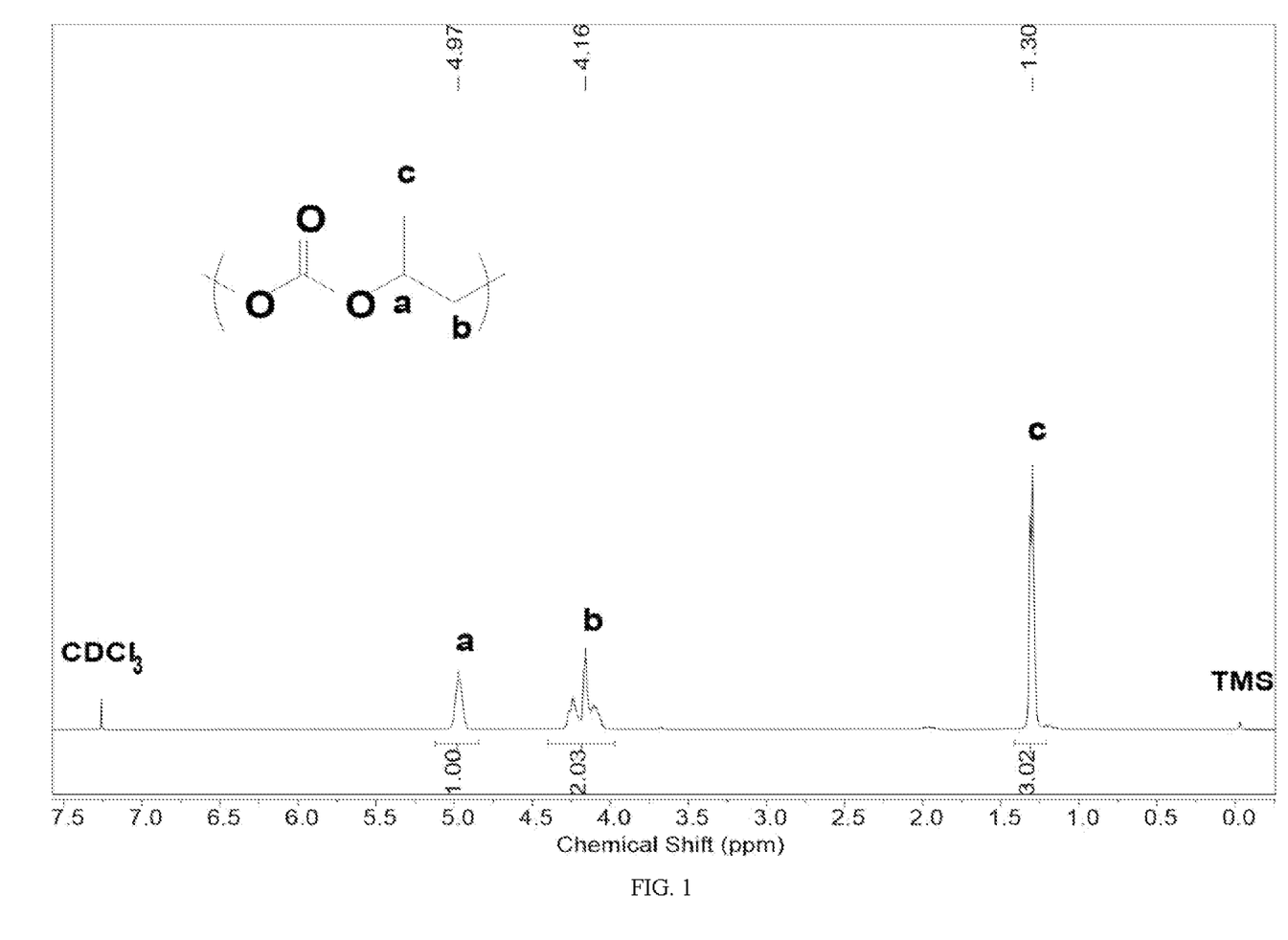
FIG. 1 is a nuclear magnetic resonance ($^1$H NMR) analytical spectrum of a copolymer product prepared in an Embodiment 3.

The $^1$H NMR spectrum of the polycarbonate prepared in this embodiment is shown in FIG. 1. As shown in FIG. 1, peaks corresponding to polyether units are not seen, indicating that the resulting product has an alternating unit structure. The positions of peaks and the integral areas corresponding to each hydrogen atom on polycarbonate units are also given in FIG. 1.

Embodiment 4: $CO_2$/PO One-Pot Copolymerization for Synthesizing Polycarbonate Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid tributylborane (TBB) are added to the reactor in a molar ratio of 1:1; $CO_2$, propylene oxide (PO) (herein the molar ratio of $CO_2$ to PO is 3:1) and 3 mL of dimethylformamide (DMF) are added; the molar ratio of Lewis base 3 to PO is 1:100. The autoclave is then closed and placed in an ice water bath at 0° C. under autogenous pressure for 16 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 5: $CO_2$/PO One-Pot Copolymerization for Synthesizing Polycarbonate Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid triethylborane (TEB) are added to the reactor in a molar ratio of 1:1; $CO_2$, propylene oxide (PO) (herein the molar ratio of $CO_2$ to PO is 2:1) and 3 mL of dimethylformamide (DMF) are added; the molar ratio of Lewis base 3 to PO is 1:150. The autoclave is then closed and placed in an ice water bath at 0° C. under autogenous pressure for 15 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 6: $CO_2$/PO One-Pot Copolymerization for Synthesizing Polycarbonate The polymerization conditions are the same as in the Embodiment 5, except that the autoclave is closed and placed in an oil bath at 40° C. for 15 h under autogenous pressure.

The content of each unit in the polymer is calculated by NMR hydrogen spectroscopy, and the molecular weight and molecular weight distribution of the polymer is determined by gel chromatography. The test results are shown in Table 1.

Embodiment 7: $CO_2$/PO One-Pot Copolymerization for Synthesizing Polycarbonate The polymerization conditions are the same as in the Embodiment 5, except that the autoclave is closed and placed in an oil bath at 80° C. for 15 h under autogenous pressure.

The content of each unit in the polymer is calculated by NMR hydrogen spectroscopy, and the molecular weight and molecular weight distribution of the polymer is determined by gel chromatography. The test results are shown in Table 1.

Embodiment 8: $CO_2$/PO One-Pot Copolymerization for Synthesizing Polycarbonate Before the polymerization reaction, a 10 mL autoclave is placed at 110° C. for about 2 h to remove water and cooled to room temperature in a desiccator; several masses of Lewis base 4 N,N,N',N'-tetraethylmalondiamine (E-P) and Lewis acid di(trimethylphenyl)boron fluoride (FTMB) are added to the reactor in a molar ratio of 1:2; $CO_2$, propylene oxide (PO) (herein the molar ratio of $CO_2$ to PO is 1:1) and 3 mL of N,N-dimethylformamide (DMF) are added; the molar ratio of Lewis base 4 to PO is 1:50. The autoclave is then closed and placed in an oil bath at 80° C. under autogenous pressure for 0.5 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 9: $CO_2$/CHO One-Pot Copolymerization for Synthesizing Polycarbonate Before the polymerization reaction, a 10 mL autoclave is placed at 110° C. for about 2 h to remove water and cooled to room temperature in a desiccator; several masses of Lewis base 5N,N,N',N'-Tetraethylmethanediamine (E-M) and Lewis acid triethylaluminum (TEAl) are added to the reactor in a molar ratio of 1:8; $CO_2$ and cyclohexene oxide (CHO) (herein the molar ratio of $CO_2$ to CHO is 1:1) are added; the molar ratio of Lewis base 5 to CHO is 1:250. The autoclave is then closed and placed in an oil bath at 80° C. under autogenous pressure for 8 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Figure 2:
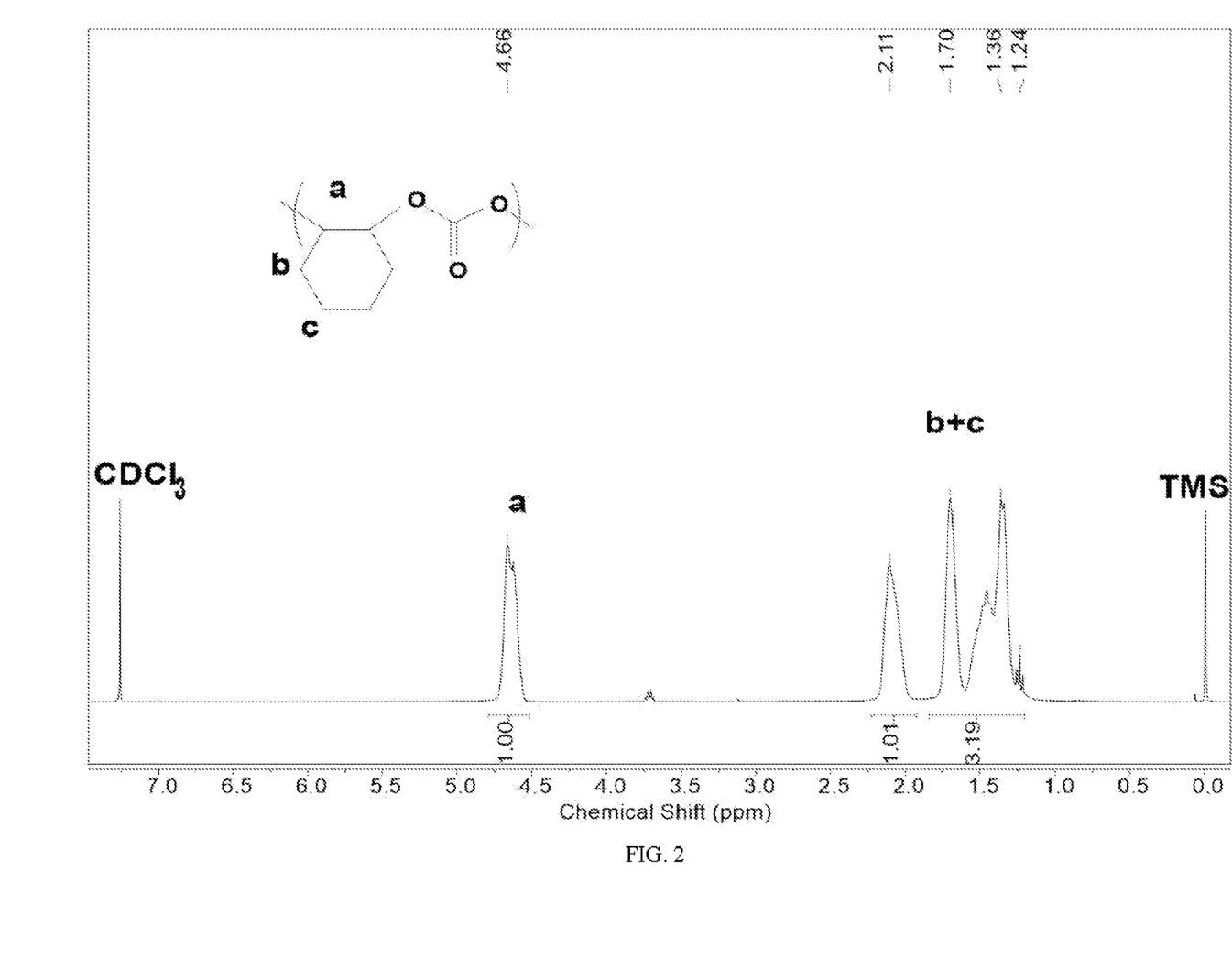
FIG. 2 is a nuclear magnetic resonance ($^1$H NMR) analytical spectrum of a copolymer product prepared in an Embodiment 9.

The $^1$H NMR spectrum of the polycarbonate prepared in this embodiment is shown in FIG. 2. As shown in FIG. 2, peaks corresponding to polyether units are not seen, indicating that the resulting product has an alternating unit structure. The positions of peaks and the integral areas corresponding to each hydrogen atom on polycarbonate units are also given in FIG. 2.

Embodiment 10: COS/PO One-Pot Copolymerization for Synthesizing Poly(Monothiocarbonate)

Before the polymerization reaction, a 10 mL autoclave is placed at 110° C. for about 2 h to remove water and cooled to room temperature in a desiccator; several masses of Lewis base 6 N,N,N',N'-Tetramethylethylenediamine (M-E) and Lewis acid triethylborane (TEB) are added to the reactor in a molar ratio of 1:2; COS, propylene oxide (PO) (herein the molar ratio of COS to PO is 10:1) and 3 mL of dimethyl sulfoxide (DMSO) are added; the molar ratio of Lewis base 6 to PO is 1:2000. The autoclave is then closed and placed in an oil bath at 25° C. under autogenous pressure for 2 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Figure 3:
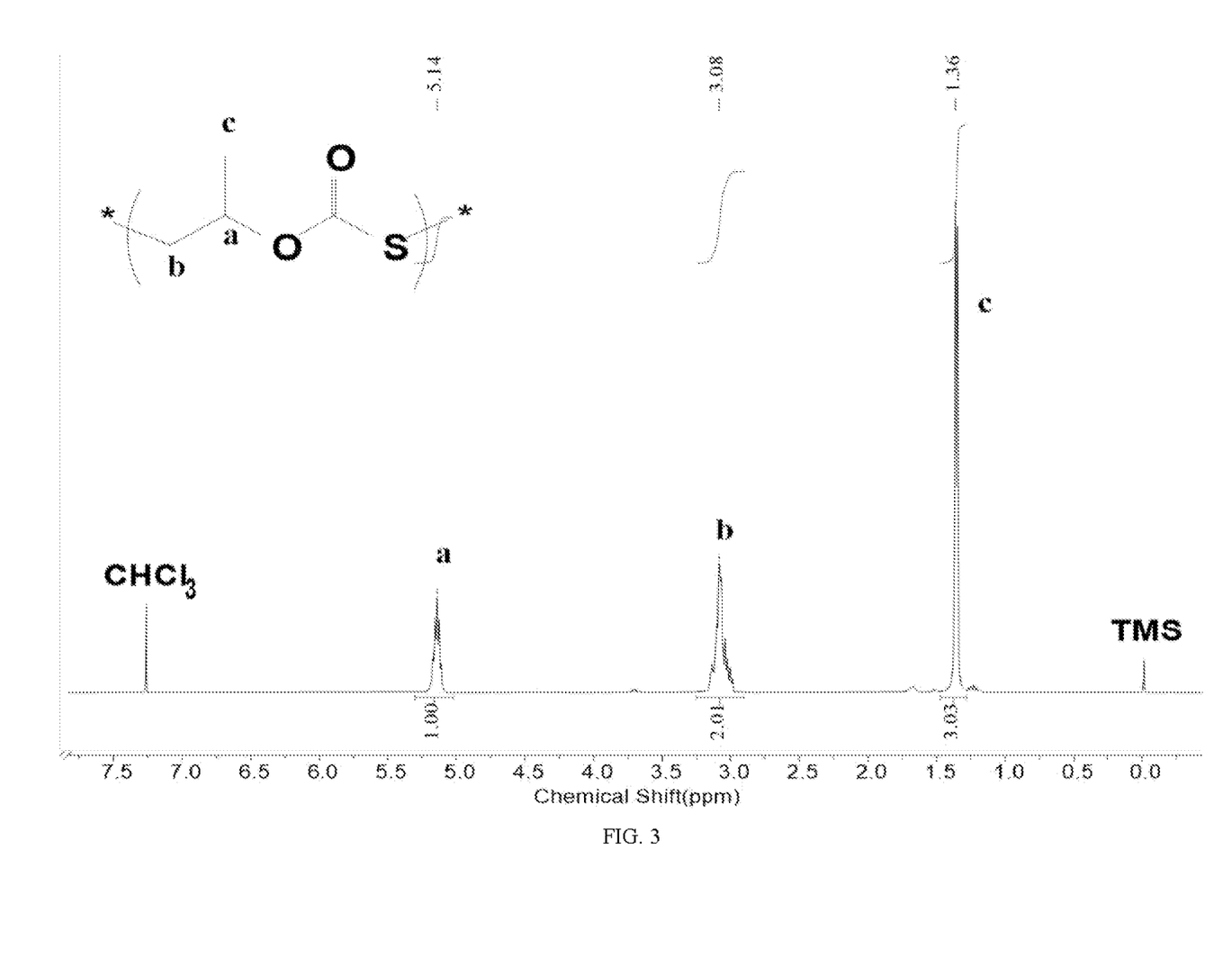
FIG. 3 is a nuclear magnetic resonance ($^1$H NMR) analytical spectrum of a copolymer product prepared in an Embodiment 10.
Figure 4:
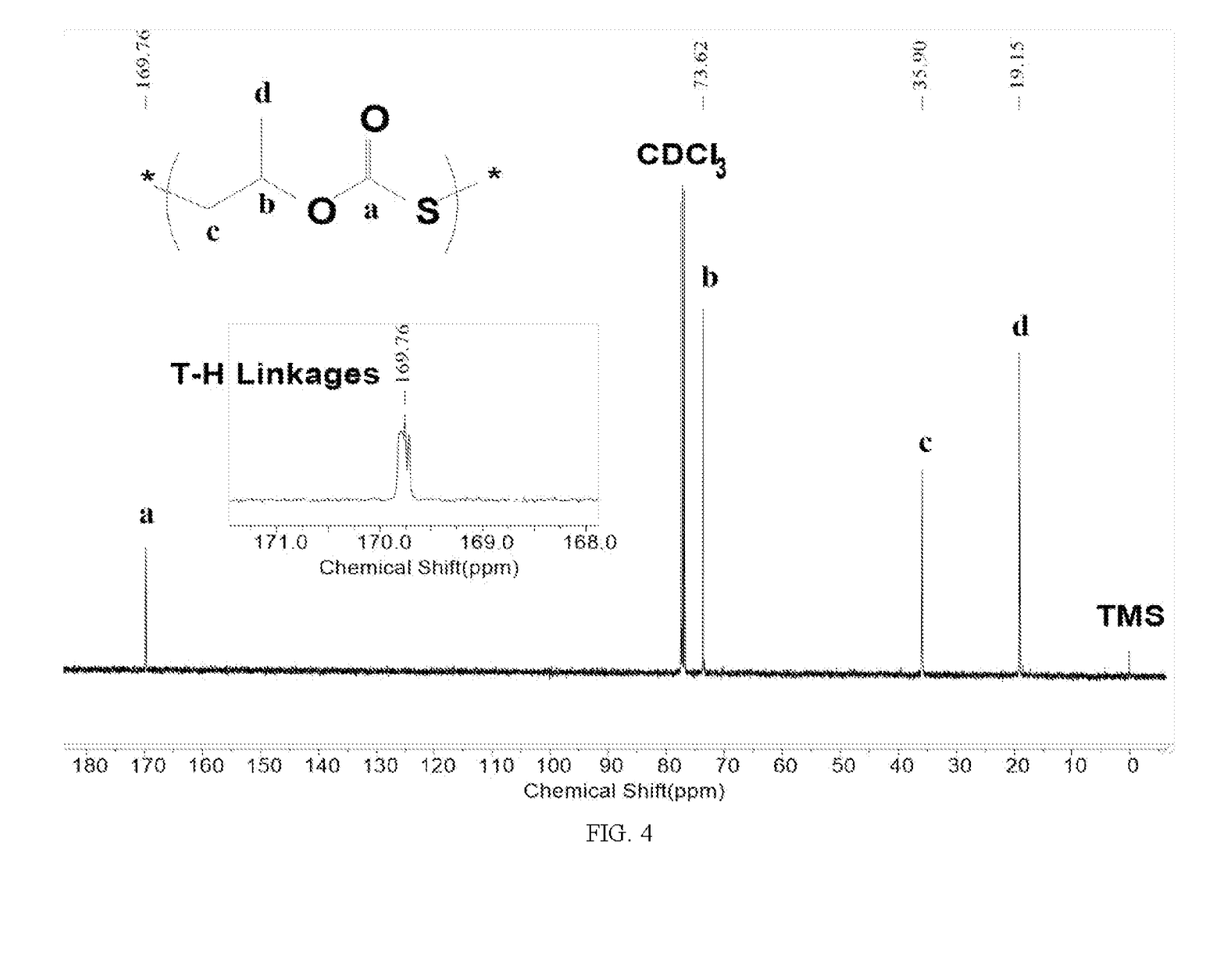
FIG. 4 is a nuclear magnetic resonance ($^{13}$C NMR) analytical spectrum of a copolymer product prepared in an Embodiment 10.

The $^1$H NMR spectrum of the poly(monothiocarbonate) prepared in this embodiment is shown in FIG. 3, and the $^{13}$C NMR spectrum of the same is shown in FIG. 4. As shown in FIG. 3, peaks corresponding to polyether, poly(thioether), and various other thiocarbonate units are not seen, indicating that the resulting product has an alternating unit structure. The positions of peaks and the integral areas corresponding to each hydrogen atom on monothiocarbonate chain units are also given in FIG. 3. As shown in FIG. 4, the content of a head and tail structure of the copolymerization product is equal to or greater than 99%.

Embodiment 11: COS/PO One-Pot Copolymerization for Synthesizing Poly(Monothiocarbonate)

Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid triethylborane (TEB) are added to the reactor in a molar ratio of 1:2; COS and propylene oxide (PO) (herein the molar ratio of COS to PO is 1:1) are added; the molar ratio of Lewis base 3 to PO is 1:1000. The autoclave is then closed and placed in an oil bath at 60° C. under autogenous pressure for 0.5 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 12: COS/PO One-Pot Copolymerization for Synthesizing Poly(Monothiocarbonate)

The polymerization conditions are the same as in the Embodiment 11, except that the Lewis base was replaced with Lewis base 6 N,N,N',N'-tetramethylethylenediamine (M-E).

The content of each unit in the polymer is calculated by NMR hydrogen spectroscopy, and the molecular weight and molecular weight distribution of the polymer is determined by gel chromatography. The test results are shown in Table 1.

Embodiment 13: COS/PO One-Pot Copolymerization for Synthesizing Poly(Monothiocarbonate)

The polymerization conditions are the same as in the Embodiment 11, except that the Lewis base was replaced with Lewis base 7 N,N,N',N'-Tetramethylmethanediamine (M-M).

The content of each unit in the polymer is calculated by NMR hydrogen spectroscopy, and the molecular weight and molecular weight distribution of the polymer is determined by gel chromatography. The test results are shown in Table 1.

Embodiment 14: COS/PO One-Pot Copolymerization for Synthesizing Poly(Monothiocarbonate)

Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid triethylborane (TEB) are added to the reactor in a molar ratio of 1:1; COS and propylene oxide (PO) (herein the molar ratio of COS to PO is 2:1) are added; the molar ratio of Lewis base 3 to PO is 1:500. The autoclave is then closed and placed in an oil bath at 60° C. under autogenous pressure for 0.017 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Figure 5:
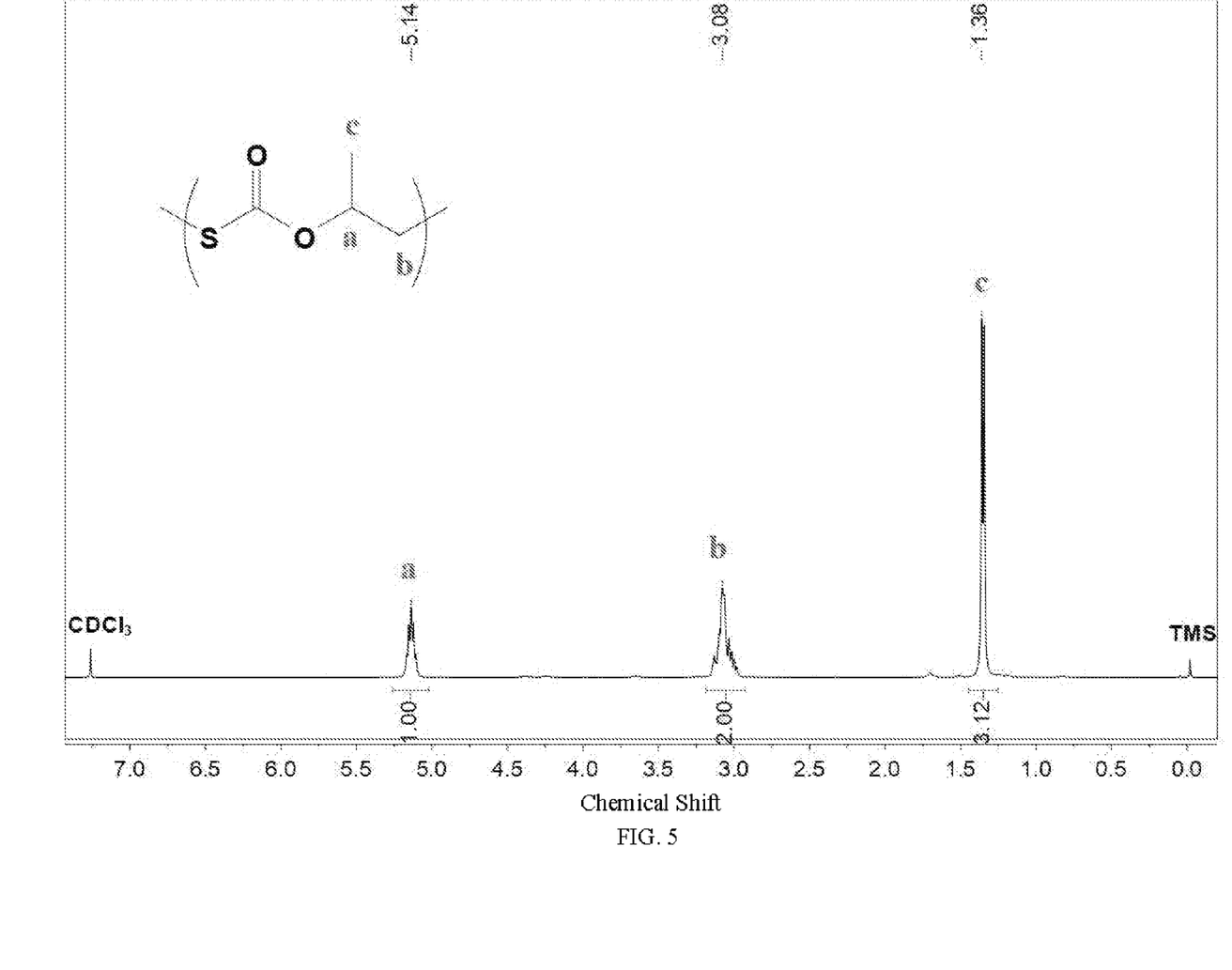
FIG. 5 is a nuclear magnetic resonance ($^1$H NMR) analytical spectrum of a copolymer product prepared in an Embodiment 14.

The $^1$H NMR spectrum of the polycarbonate prepared in this embodiment is shown in FIG. 5. As shown in FIG. 2, peaks corresponding to polyether units are not seen, indicating that the resulting product has an alternating unit structure. The positions of peaks and the integral areas corresponding to each hydrogen atom on polycarbonate units are also given in FIG. 2.

Embodiment 15: COS/PO One-Pot Copolymerization for Synthesizing Poly(Monothiocarbonate)

Before the polymerization reaction, a 10 mL autoclave is placed at 110° C. for about 2 h to remove water and cooled to room temperature in a desiccator; several masses of Lewis base 7 N,N,N',N'-Tetramethylmethanediamine (M-M) and Lewis acid triethylaluminum (TEAl) are added to the reactor in a molar ratio of 1:0.8; COS, propylene oxide (PO) (herein the molar ratio of COS to PO is 1:1) and 3 mL of dimethyl sulfoxide (DMSO) are added; the molar ratio of Lewis base 7 to PO is 1:1000. The autoclave is then closed and placed in an oil bath at 25° C. under autogenous pressure for 1 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 16: COS/PO One-Pot Copolymerization for Synthesizing Poly(Monothiocarbonate)

Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid di(trimethylphenyl)boron fluoride (FTMB) are added to the reactor in a molar ratio of 1:2; COS, propylene oxide (PO) (herein the molar ratio of COS to PO is 2:1) and 3 mL of tetrahydrofuran (THF) are added; the molar ratio of Lewis base 3 to PO is 1:50. The autoclave is then closed and placed in an oil bath at 50° C. under autogenous pressure for 0.5 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

Figure 6:
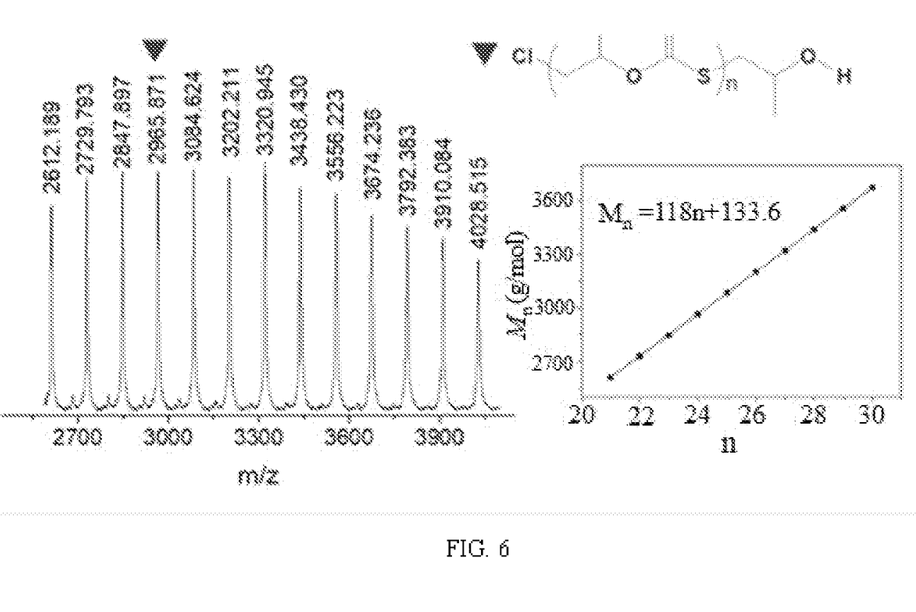
FIG. 6 is an analytical spectrum of matrix-assisted laser desorption time-of-flight mass spectrometry (MALDI-TOF-MS) of a copolymer product prepared in an Embodiment 16.

The content of each unit in the polymer is calculated by NMR hydrogen spectroscopy, and the molecular weight and molecular weight distribution of the polymer is determined by gel chromatography. The test results are shown in Table 1. Based on the matrix-assisted laser desorption-time-of-flight mass spectrometry (MALDI-TOF-MS) analysis shown in FIG. 6 allowed, it can be determined that the polymer prepared by this Lewis acid-base pair-catalyzed initiation system has a hydroxyl group at one end and a chlorine group at the other end. The hydroxyl group at the end of the chain indicates that the polymerization reaction ends with the ring opening of attacking epoxide, and the chlorine end group is formed by the action of the quaternary ammonium salt at the beginning of the chain with hydrochloric acid during a post-treatment process, which is consistent with the proposed mechanism of Lewis base as initiator.

Embodiment 17: COS/PGE One-Pot Copolymerization for Synthesizing Polycarbonate Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid triethylborane (TEB) are added to the reactor in a molar ratio of 1:4; COS, PGE (herein the molar ratio of COS to PGE is 1:1) and 3 mL of dimethylformamide (DMF) are added; the molar ratio of Lewis base 3 to PGE is 1:4000. The autoclave is then closed and placed in an oil bath at 100° C. under autogenous pressure for 8 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 18: COS/CHO One-Pot Copolymerization for Synthesizing Poly(Monothiocarbonate)

Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid triethylaluminum (TEAl) are added to the reactor in a molar ratio of 5:1; COS, cyclohexene oxide (CHO) (herein the molar ratio of COS to CHO is 1:1) and 3 mL of dimethylformamide (DMF) are added; the molar ratio of Lewis base 3 to CHO is 1:800. The autoclave is then closed and placed in an oil bath at 80° C. under autogenous pressure for 10 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 19: COS/PO One-Pot Copolymerization for Synthesizing a Di-Block Copolymer of Poly(Monothiocarbonate)-b-MPEG Before the polymerization reaction, a 10 mL autoclave is placed at 110° C. for about 2 h to remove water and cooled to room temperature in a desiccator; several masses of Lewis base 5N,N,N',N'-Tetraethylmethanediamine (E-M) and Lewis acid triethylborane (TEB) are added to the reactor in a molar ratio of 0.2:1; COS, PO (herein the molar ratio of COS to PO is 5:1), MPEG2000 with 10 times the molar amount of Lewis base and 3 mL of o-dichlorobenzene (ODCB) are added; the molar ratio of Lewis base 5 to PO is 1:1000. The autoclave is then closed and placed in an oil bath at 60° C. under autogenous pressure for 10 h. After the reaction is completed and cooled to room temperature, the crude product is first dissolved in tetrahydrofuran, with which a polymer is precipitated in a mixture of ethanol/ deionized water/hydrochloric acid. The polymer is washed three times and dried under vacuum to a constant weight.

Since the chain transfer agent has an active end, the final product is a di-block copolymer. The content of each unit in the polymer is calculated by NMR hydrogen spectroscopy, and the molecular weight and molecular weight distribution of the polymer is determined by gel chromatography. The test results are shown in Table 1.

Embodiment 20: COS/PO One-Pot Copolymerization for Synthesizing a Di-Block Copolymer of Poly(Monothiocarbonate)-b-MPEG Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid triethylborane (TEB) are added to the reactor in a molar ratio of 1:1; COS, PO (herein the molar ratio of COS to PO is 2:1), MPEG2000 with 10 times the molar amount of Lewis base and 3 mL of tetrahydrofuran (THF) are added; the molar ratio of Lewis base 3 to PO is 1:500. The autoclave is then closed and placed in an oil bath at 60° C. under autogenous pressure for 5 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

Since the chain transfer agent has an active end, the final product is a di-block copolymer. The content of each unit in the polymer is calculated by NMR hydrogen spectroscopy, and the molecular weight and molecular weight distribution of the polymer is determined by gel chromatography. The test results are shown in Table 1.

Embodiment 21: COS/PO One-Pot Copolymerization for Synthesizing a Di-Block Copolymer of Poly(Monothiocarbonate)-b-MPEG The polymerization conditions are the same as in the Embodiment 20, except that the molar ratio of Lewis base 3 to PO is replaced by 1:1000. The content of each unit in the polymer is calculated by NMR hydrogen spectroscopy, and the molecular weight and molecular weight distribution of the polymer is determined by gel chromatography. The test results are shown in Table 1.

Embodiment 22: COS/PO One-Pot Copolymerization for Synthesizing a Di-Block Copolymer of Poly(Monothiocarbonate)-b-MPEG The polymerization conditions are the same as in the Embodiment 20, except that the molar ratio of Lewis base 3 to PO is replaced by 1/1500. The content of each unit in the polymer is calculated by NMR hydrogen spectroscopy, and the molecular weight and molecular weight distribution of the polymer is determined by gel chromatography. The test results are shown in Table 1.

Embodiment 23: COS/PO One-Pot Copolymerization for Synthesizing a Tri-Block Copolymer Before the polymerization reaction, a 10 mL autoclave is placed at 110° C. for about 2 h to remove water and cooled to room temperature in a desiccator; several masses of Lewis base 6 N,N,N',N'-tetramethylethylenediamine (M-E) and Lewis acid triethylborane (TEB) are added to the reactor in a molar ratio of 1:1; COS, PO (herein the molar ratio of COS to PO is 2:1), PEG400 with 10 times the molar amount of Lewis base and 3 mL of o-dichlorobenzene (ODCB) are added; the molar ratio of Lewis base 6 to PO is 1:500. The autoclave is then closed and placed in an oil bath at 60° C. under autogenous pressure for 6 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 24: MA/PO One-Pot Copolymerization for Synthesizing Unsaturated Polyester Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid triethylborane (TEB) are added to the reactor in a molar ratio of 1:1; MA and PO (herein the molar ratio of PO to MA is 1:4) are added; the molar ratio of Lewis base3 to PO is 1:100. The autoclave is then closed and placed in an oil bath at 45° C. under autogenous pressure for 4 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Embodiment 25: SA/PO One-Pot Copolymerization for Synthesizing Polyester

Before the polymerization reaction, a 10 mL autoclave is placed at 110° C. for about 2 h to remove water and cooled to room temperature in a desiccator; several masses of Lewis base 3 N,N,N',N'-tetraethyl ethylenediamine (E-E) and Lewis acid triethylborane (TEB) are added to the reactor in a molar ratio of 1:1; SA and PO (herein the molar ratio of PO to SA is 1:4) are added; the molar ratio of Lewis base 3 to PO is 1:100. The autoclave is then closed and placed in an oil bath at 60° C. under autogenous pressure for 10 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 1.

Comparison 1: PO One-Pot Copolymerization for Synthesizing Polyether

Before the polymerization reaction, a 10 mL autoclave is placed at 110° C. for about 2 h to remove water and cooled to room temperature in a desiccator; several masses of Lewis base 1 triethylamine (TEA) and Lewis acid triethylborane (TEB) are added to the reactor in a molar ratio of 1:2; the molar ratio of Lewis base 1 to propylene oxide (PO) is 1:1000. The autoclave is then closed and placed in an oil bath at 60° C. under autogenous pressure for 12 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 2.

Comparison 2: PO One-Pot Copolymerization for Synthesizing Polyether

Before the polymerization reaction, a 10 mL autoclave is placed at 110° C. for about 2 h to remove water and cooled to room temperature in a desiccator; several masses of Lewis base 2 tributylamine (TBA) and Lewis acid triethylaluminum (TEAl) are added to the reactor in a molar ratio of 1:4; the molar ratio of Lewis base 2 to propylene oxide (PO) is 1:2000. The autoclave is then closed and placed in an oil bath at 40° C. under autogenous pressure for 10 h. After the reaction is completed and cooled to room temperature, the molecular weight distribution of the polymer is determined by gel chromatography. The test results are shown in Table 2.

Comparison 3: MA/PO One-Pot Copolymerization for Synthesizing Unsaturated Polyester Before the polymerization reaction, a 10 mL autoclave is placed at 110° C. for about 2 h to remove water and cooled to room temperature in a desiccator; several masses of Lewis base 1 triethylamine (TEA) and Lewis acid triethylborane (TEB) are added to the reactor in a molar ratio of 1:1; MA and PO (herein the molar ratio of PO to MA is 1:4) are added; the molar ratio of Lewis base 1 to PO is 1:100. The autoclave is then closed and placed in an oil bath at 45° C. under autogenous pressure for 12 h. After the reaction is completed and cooled to room temperature, the crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and molecular weight distribution of the polymer is determined by gel chromatography. The test results are shown in Table 2.

TABLE 1

| Embodiment | epoxide[1] | T (° C.) | LB[2] | LA[3] | LB/LA/epoxide/comonomer[4] | comonomer[5] | Solvent[6] | t (h) | TOF $h^{-1}$ | $M_n$[7] (kg/mol) | PDI[8] |
|---|---|---|---|---|---|---|---|---|---|---|---|
| 1 | PO | 60 | 3 | TEB | 1/2/1000/— | — | — | 3.0 | 80 | 11.2 | 1.2 |
| 2 | PO | 40 | 4 | TEAl | 1/4/2000/— | — | — | 2.5 | 70 | 8.2 | 1.1 |
| 3 | PO | 40 | 3 | TBB | 0.5/1/250/250 | $CO_2$ | THF | 8.0 | 75 | 44.4 | 1.3 |
| 4 | PO | 0 | 3 | TBB | 1/1/100/300 | $CO_2$ | DMF | 16.0 | 8 | 26.8 | 1.4 |
| 5 | PO | 0 | 3 | TEB | 1/1/150/300 | $CO_2$ | DMF | 15.0 | 4 | 3.9 | 1.4 |
| 6 | PO | 40 | 3 | TEB | 1/1/150/300 | $CO_2$ | DMF | 15.0 | 7 | 8.2 | 1.2 |
| 7 | PO | 80 | 3 | TEB | 1/1/150/300 | $CO_2$ | DMF | 15.0 | 10 | 10.8 | 1.2 |
| 8 | PO | 80 | 4 | FTMB | 1/2/50/50 | $CO_2$ | DMF | 0.5 | 82 | 1.0 | 1.1 |
| 9 | CHO | 80 | 5 | TEAl | 1/8/250/250 | $CO_2$ | — | 8.0 | 30 | 17.1 | 1.3 |
| 10 | PO | 25 | 6 | TEB | 1/2/2000/20000 | COS | DMSO | 2.0 | 860 | 100.0 | 1.4 |
| 11 | PO | 60 | 3 | TEB | 1/2/1000/1000 | COS | — | 0.5 | 1960 | 98.4 | 1.2 |
| 12 | PO | 60 | 6 | TEB | 1/2/1000/1000 | COS | — | 0.5 | 970 | 38.7 | 1.5 |
| 13 | PO | 60 | 7 | TEB | 1/2/1000/1000 | COS | — | 0.5 | 1240 | 46.2 | 1.3 |
| 14 | PO | 60 | 3 | TEB | 1/1/500/1000 | COS | — | 0.017 | 22500 | 53.6 | 1.3 |
| 15 | PO | 25 | 7 | TEAl | 1/0.8/1000/1000 | COS | DMSO | 1.0 | 930 | 84.4 | 1.4 |
| 16 | PO | 50 | 3 | FTMB | 1/2/50/100 | COS | THF | 0.5 | 99 | 4.2 | 1.3 |
| 17 | PGE | 100 | 3 | TEB | 1/4/4000/4000 | COS | DMF | 8.0 | 360 | 73.5 | 1.3 |
| 18 | CHO | 80 | 3 | TEAl | 5/1/4000/4000 | COS | DMF | 10.0 | 75 | 63.0 | 1.2 |
| 19[9] | PO | 60 | 5 | TEB | 0.2/1/200/1000 | COS | ODCB | 10.0 | 920 | 43.0 | 1.2 |
| 20[9] | PO | 60 | 3 | TEB | 1/1/500/1000 | COS | THF | 5.0 | 98 | 5.9 | 1.2 |
| 21[9] | PO | 60 | 3 | TEB | 1/1/1000/2000 | COS | THF | 5.0 | 199 | 10.7 | 1.1 |
| 22[9] | PO | 60 | 3 | TEB | 1/1/1500/3000 | COS | THF | 5.0 | 297 | 21.0 | 1.1 |
| 23[10] | PO | 60 | 6 | TEB | 1/1/500/1000 | COS | ODCB | 6.0 | 70 | 65.0 | 1.1 |
| 24 | PO | 45 | 3 | TEB | 1/1/100/400 | MA | — | 4.0 | 98 | 7.0 | 1.1 |
| 25 | PO | 60 | 3 | TEB | 1/1/100/400 | SA | — | 10.0 | 38 | 6.4 | 1.1 |

TABLE 2

| Comparison | epoxide[1] | T (° C.) | LB[2] | LA[3] | LB/LA/epoxide/comonomer[4] | comonomer[5] | Solvent[6] | t (h) | TOF $h^{-1}$ | $M_n$[7] (kg/mol) | PDI[8] |
|---|---|---|---|---|---|---|---|---|---|---|---|
| 1 | PO | 60 | 1 | TEB | 1/2/1000/— | — | — | 12.0 | 20 | 10.4 | 1.2 |
| 2 | PO | 40 | 2 | TEAl | 1/4/2000/— | — | — | 10.0 | 18 | 8.5 | 1.1 |
| 3 | PO | 45 | 1 | TEB | 1/1/100/400 | MA | — | 12.0 | 32 | 6.6 | 1.1 | crude product is first dissolved in tetrahydrofuran, with which a polymer is precipitated in a mixture of ethanol/deionized water/hydrochloric acid. The polymer is washed three times and dried under vacuum to a constant weight.

The content of each unit in the polymer is calculated by NMR hydrogen spectroscopy, and the molecular weight and

[1]Epoxide species. [2]Lewis base species: 1 for triethylamine (TEA), 2 for tributylamine (TBA), 3 for N,N,N',N'-tetraethyl ethylenediamine (E-E), 4 for N,N,N',N'-tetraethyl malondiamine (E-P), 5 for N,N,N',N'-tetraethyl methanediamine (E-M), 6 for N,N,N',N'-tetramethyl ethylenediamine (M-M). (M-E), 7 is N,N,N',N'-tetramethyl methanediamine (M-M). [3]Lewis acid species, TEB: triethylborane, TBB: tributyl boron, FTMB: di(trimethylphenyl)boron fluoride, TEAl: triethyl aluminum. [4]Molar ratio of [Lewis base]:[Lewis acid]:[epoxide:[comonomer]. [5]Comonomer species, $CO_2$: carbon dioxide; COS: carbon oxysulfide; MA: maleic anhydride; SA: succinic anhydride. [6]Solvent type, THF: tetrahydrofuran, DMF: dimethylformamide, DMSO: dimethyl sulfoxide, ODCB: o-dichlorobenzene. [7]Mn: number average molecular weight, determined by gel permeation chromatography. [8]PDI: molecular weight distribution, determined by gel permeation chromatography. [9]Adding chain transfer agent polyethylene glycol methyl ether 2000 with 10 times the molar amount of Lewis base.[10]Adding chain transfer agent polyethylene glycol 4000 with 10 times the molar amount of Lewis base.

What is claimed is:

1. A Lewis acid-base pair catalytic initiator, comprising a Lewis acid and a Lewis base, the Lewis acid having a structural general formula as shown in formula (I) and the Lewis base having a structural general formula as shown in formula (II);

wherein:
the A is selected from element Boron or element Aluminum;
the $R_1$, $R_2$, $R_3$, $R_4$ are independently selected from alkyl, alkoxy, aryl or halogen groups;
the alkyl or alkoxy have a carbon number being equal to or greater than 1 to equal to or less than 16;
the aryl contains substituents with the number being equal to or less than 5, the substituents being selected from methyl, methoxy or halogen;
n is selected from an integer from 1 to 16.

2. The Lewis acid-base pair catalytic initiator according to claim 1, wherein the Lewis acid is selected from at least one of triethylborane, tripropylborane, tributylborane, tri-sec-butylborane, triphenylborane, tris(pentafluorophenyl)borane, diethylmethoxyborane, di(trimethylphenyl)borane fluoride, trimethylaluminum, triethylaluminum, triisobutylaluminum, triphenylaluminum, and tris(pentafluorophenyl) aluminum;
the Lewis base is selected from at least one of N,N,N',N'-tetramethylmethanediamine, N,N,N',N'-tetramethylethylenediamine, N,N,N',N'-tetraethylmethanediamine, N,N,N',N'-tetraethylethylenediamine, and N,N,N',N'-tetraethyl-1,3-propanediamine.

3. An application of a Lewis acid-base pair catalytic initiator in a preparation of an epoxide homopolymer, wherein the Lewis acid-base pair catalytic initiator comprises a Lewis acid and a Lewis base, the Lewis acid having a structural general formula as shown in formula (I) and the Lewis base having a structural general formula as shown in formula (II);

wherein:
the A is selected from element Boron or element Aluminum;
the $R_1$, $R_2$, $R_3$, $R_4$ are independently selected from alkyl, alkoxy, aryl or halogen groups;
the alkyl or alkoxy have a carbon number being equal to or greater than 1 to equal to or less than 16;
the aryl contains substituents with the number being equal to or less than 5, the substituents being selected from methyl, methoxy or halogen;
n is selected from an integer from 1 to 16;
wherein a molar ratio of the Lewis acid to the Lewis base is from 0.125:1 to 8:1.

4. The application of the Lewis acid-base pair catalytic initiator in the preparation of the epoxide homopolymer according to claim 3, wherein:
the epoxide is selected from at least one of ethylene oxide, propylene oxide, epichlorohydrin, allyl glycidyl ether, 1,2-butylene oxide, isobutylene oxide, cyclohexene oxide, 4-vinyl cyclohexene oxide, styrene oxide, limonene oxide, cyclopentene oxide and alpha-alkene oxide from C5 to C20;
the molar ratio of the Lewis acid to the Lewis base is from 0.5:1 to 4:1; a molar ratio of the Lewis base to the epoxide is from 1:50 to 1:4000; a homopolymerization reaction is carried out under a native or solution condition, the homopolymerization reaction being carried out at a temperature of 0 to 100 °C.

5. The application of the Lewis acid-base pair catalytic initiator in the preparation of the epoxide homopolymer according to claim 3, wherein the epoxide homopolymer is prepared with an addition of a chain transfer agent;
the chain transfer agent is selected from at least one of an alcoholic small molecule, a terminal hydroxyl group polymer, a carboxylic acid small molecule, and a terminal carboxyl group polymer.

6. An application of a Lewis acid-base pair catalytic initiator in a preparation of an epoxide copolymer,
wherein the Lewis acid-base pair catalytic initiator comprises a Lewis acid and a Lewis base, the Lewis acid having a structural general formula as shown in formula (I) and the Lewis base having a structural general formula as shown in formula (II);

wherein:
the A is selected from element Boron or element Aluminum;
the $R_1$, $R_2$, $R_3$, $R_4$ are independently selected from alkyl, alkoxy, aryl or halogen groups;
the alkyl or alkoxy have a carbon number being equal to or greater than 1 to equal to or less than 16;
the aryl contains substituents with the number being equal to or less than 5, the substituents being selected from methyl, methoxy or halogen;
n is selected from an integer from 1 to 16;
wherein a molar ratio of the Lewis acid to the Lewis base is from 0.125:1 to 8:1.

7. The application of the Lewis acid-base pair catalytic initiator in the preparation of the epoxide copolymer according to claim 6, wherein:
the epoxide is selected from at least one of ethylene oxide, propylene oxide, epichlorohydrin, allyl glycidyl ether, 1,2-butylene oxide, isobutylene oxide, cyclohexene oxide, 4-vinyl cyclohexene oxide, styrene oxide, limonene oxide, cyclopentene oxide and alpha-alkene oxide from C5 to C20;
the molar ratio of the Lewis acid to the Lewis base is from 0.2:1 to 8:1; a molar ratio of the Lewis base to the epoxide is from 1:50 to 1:4000; a molar ratio of the epoxide to a comonomer is from 1:1 to 1:10;
the comonomer is selected from at least one of C1 monomer, cyclic anhydride, and cyclic lactone;
a copolymerization reaction is carried out under a native or solution condition, the copolymerization reaction being carried out at a temperature of 0 to 100° C. and at an autogenous pressure for 0.01 to 150 h.

8. The application of the Lewis acid-base pair catalytic initiator in the preparation of the epoxide copolymer according to claim 7, wherein:
the C1 monomer is selected from at least one of carbon dioxide, carbonyl sulfide, and carbon disulfide;
the cyclic anhydride is selected from at least one of maleic anhydride, glutaric anhydride, succinic anhydride, diglycolic anhydride, and phthalic anhydride;
the cyclic lactone is selected from at least one of propiolactone, butyrolactone, valerolactone, caprolactone, enantolactone, glycolide, lactide, and dimethyl trimethylene ester.

9. The application of the Lewis acid-base pair catalytic initiator in the preparation of the epoxide copolymer according to claim 6, wherein a comonomer is carbonyl sulfide; the Lewis base is N,N,N',N'-tetraethyl ethylenediamine, and the Lewis acid is triethylborane.

10. The application of the Lewis acid-base pair catalytic initiator in the preparation of the epoxide copolymer according to claim 6, wherein the epoxide copolymer is prepared with an addition of a chain transfer agent;
the chain transfer agent is selected from at least one of an alcoholic small molecule, a terminal hydroxyl group polymer, a carboxylic acid small molecule, and a terminal carboxyl group polymer.

* * * * *